Dec. 30, 1930.     J. R. ALLAN     1,786,884
MATERIAL HANDLING APPARATUS
Filed Dec. 5, 1928     5 Sheets-Sheet 1

Dec. 30, 1930.    J. R. ALLAN    1,786,884
MATERIAL HANDLING APPARATUS
Filed Dec. 5, 1928    5 Sheets-Sheet 5

Patented Dec. 30, 1930

1,786,884

UNITED STATES PATENT OFFICE

JAMES R. ALLAN, OF OAK PARK, ILLINOIS

MATERIAL-HANDLING APPARATUS

Application filed December 5, 1928. Serial No. 323,839.

This invention relates to a material handling apparatus designed especially for use in and about manufacturing establishments.

Specifically, the invention is for an improvement in the so called elevating or tiering shop trucks. These trucks as now standard in the art comprise a wheeled carriage which is self-propelled, and embodies a mast which includes tracks along which is movable vertically, by means of a windlass and cable, an elevator or lift platform. When this platform is in its lowermost position, the same can be moved beneath a shop skid to pick up the same, lift it off the floor, transport it, and then elevate it to any desired vertical point within the range of hoist of the lift mechanism of the truck, so as to raise the load to a convenient position for purposes of storing the skid with its contents or unloading the same by hand. This is rather awkward in the case of unloading the contents of the skid, as the operator has to climb up to the load and discharge the same by hand, and consequently this unloading operation, besides being awkward, takes time. Obviously, it would be highly desirable to provide structure which would enable the operator from his control station on the truck to tilt the platform itself or with the skid thereon, so that the material on the platform or in the skid to be unloaded might discharge itself by gravity. Such structure would materially cheapen material handling operations because it would save time.

Accordingly, it is the primary object of this invention to provide a tilting platform for an elevator or tiering shop truck, so that, when it is desired to unload the platform, the material directly on the platform or contained in the skids thereon may be caused to discharge itself by gravity.

Another object is to provide such a tilting platform, in combination with control means designed to be actuated at the will of the operator from his station on the shop truck.

It is another object of the invention to provide a front tilting platform for these trucks, and, in a modification of the invention, to provide a side tilting platform which may be tilted laterally to either side, optionally, as occasion may require.

Still another object of this invention is to provide a simple tilting platform mounting for these elevator trucks which will be reasonably cheap to produce and which can be applied to standard elevator trucks without materially altering their construction, and, lastly, one which is not likely to get out of order.

Other important and incidental objects of the invention should become apparent to those skilled in this art as this disclosure is made.

Briefly, these desirable objects are accomplished in a self-propelled elevator or tiering truck having an elevator mast and a lift platform which is adapted to be vertically raised to any desired point with respect to said mast. The platform will be modified in accordance with this invention to receive a tiltable platform part, which tiltable part is designed to receive the load, which in practice will be a skid adapted to carry material. This tiltable part will be moved by means of a toggle link structure that is operable by means of pulleys and cables associated with winding drums actuated by an operator controlled motor. In one form, this toggle lever mechanism is arranged to tilt the platform with or without the skid to the front, while, in a modification, this structure will cause the movable part of the platform with or without the skid to be tilted laterally to either side as occasion requires.

In the accompanying sheets of drawings wherein and illustrative and practicable form of the invention is shown,—

Figure 3 is a top plan view of the elevator shop truck;

Figures 7, 8, 9, 10, 11:
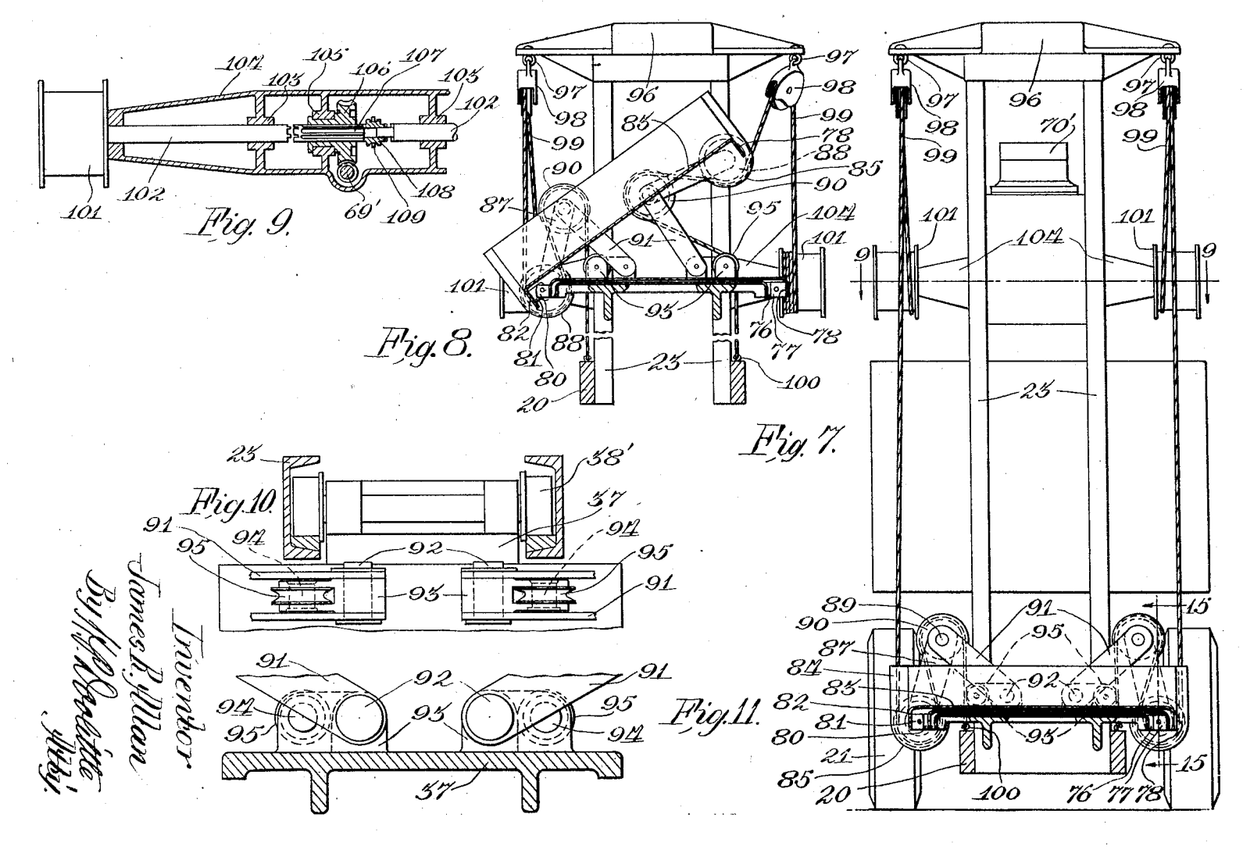
Figure 7 is a front, elevational view of the truck with the modified side tilt platform appearing in section.
Figure 8 is a similar view to Figure 7, but showing the lift platform elevated to tiering position, with the movable part of the platform in tilted position to discharge its contents laterally.
Figure 9 is a detail, sectional view to illustrate the reversing mechanism as appears along the line 9—9, looking in the direction of the arrows shown in Figure 7.
Figure 10 is a cross sectional view through the mast structure to show the lift platform associated therewith and the manner of its mounting.
Figure 11 is a face detail view of the structure shown in Figure 10 with the lift platform appearing in section.

The forms of the invention are illustrated in these drawings, as has heretofore been indicated, the one form being a front tilt construction, and the other being a lateral tilt construction. In so far as the structure of the shop truck per se is concerned, it is the same for both types of tilting platform, and accordingly, as shown in all figures of the drawings where it appears, the truck comprises a main frame 20 supported on the usual rear wheel carriage 21 and front steering wheels 22. The main frame 20 carries two upright channels 23, which, as best shown in Figures 3 and 10, are transversely spaced to face each other. These two upright channel frame members 23 constitute the mast of the truck up which the lift platform, later to be described, travels.

As is usual in these trucks, the frame 20 carries an electric motor 24 which drives the wheels 21 to move the truck as a self-propelled vehicle. The electric motor just mentioned, as is the practice in the construction of these machines, will derive its electrical energy from a generator, not shown, that is driven from an internal combustion engine, not shown, or from an electric storage battery, not shown. An operator's platform appears at 25.

Figures 1, 2:
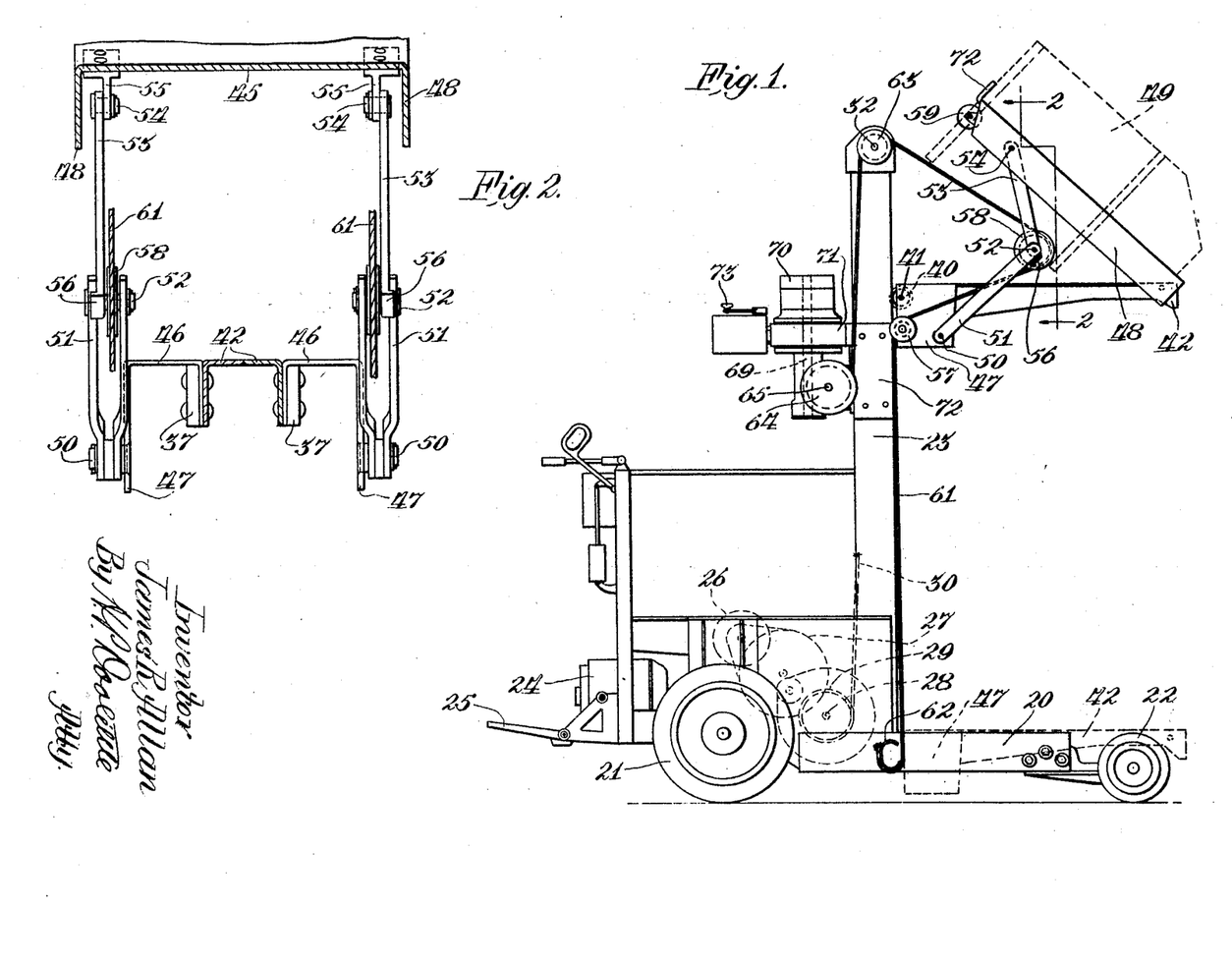
Figure 1 is a general side, elevational view of an elevator shop truck with the front tilt platform structure of this invention associated therewith.
Figure 2 is a vertical sectional view of part of the structure as seen along the line 2—2, looking in the direction of the arrows appearing in Figure 1.
Figures 4, 5:
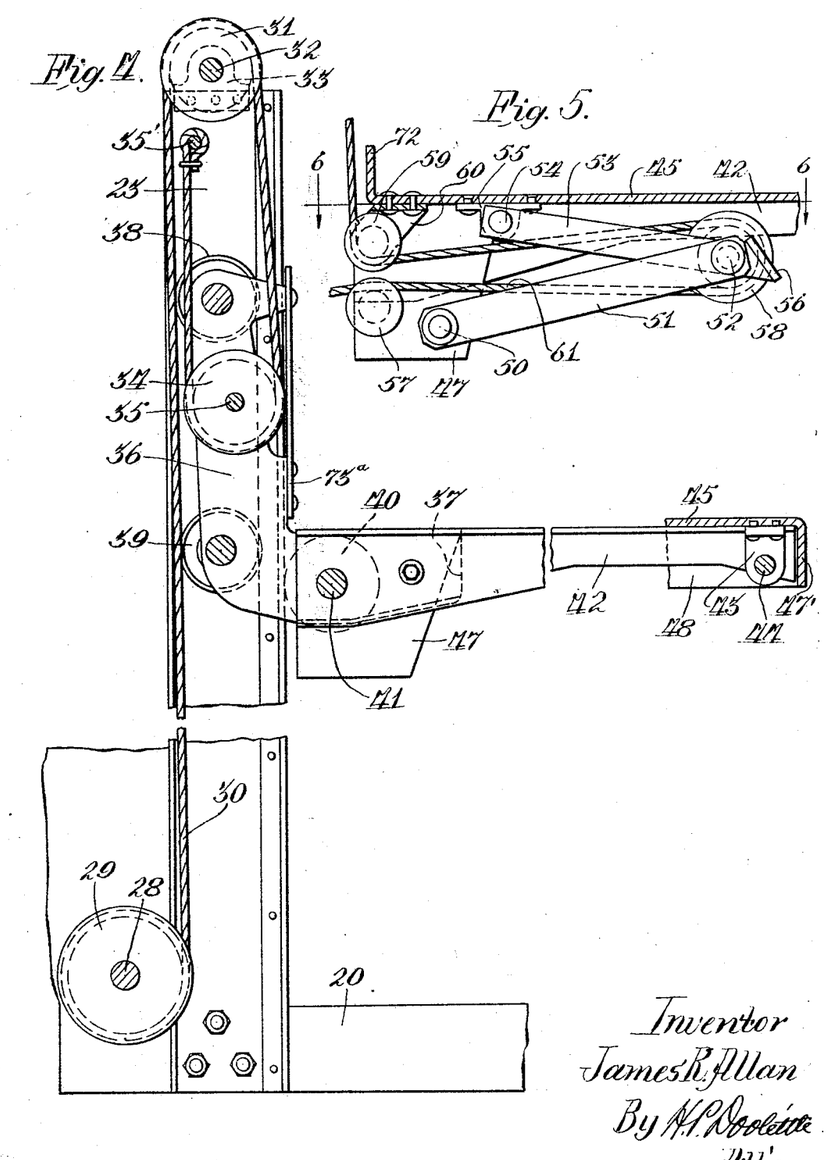
Figure 4 is a central, vertical, side, sectional view on a somewhat enlarged scale taken along the line 4—4, looking in the direction of the arrows appearing in Figure 3.
Figure 5 is a detail, vertical, sectional view through the toggle lever mechanism as would be seen along the line 5—5, looking in the direction of the arrows shown in Figure 3.
Figure 5:
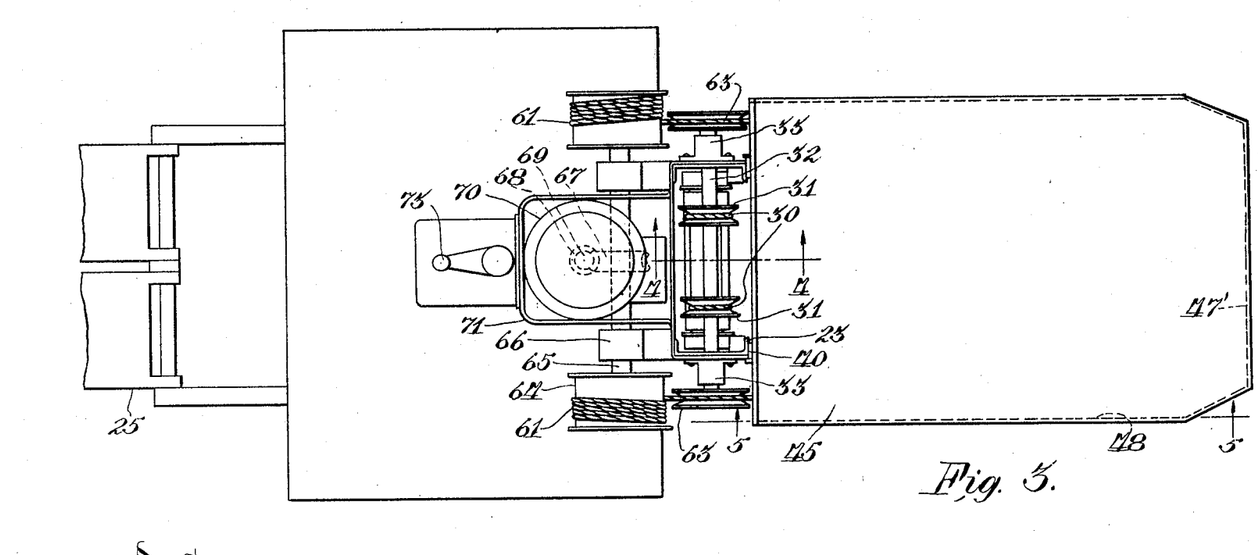
Figure 6:
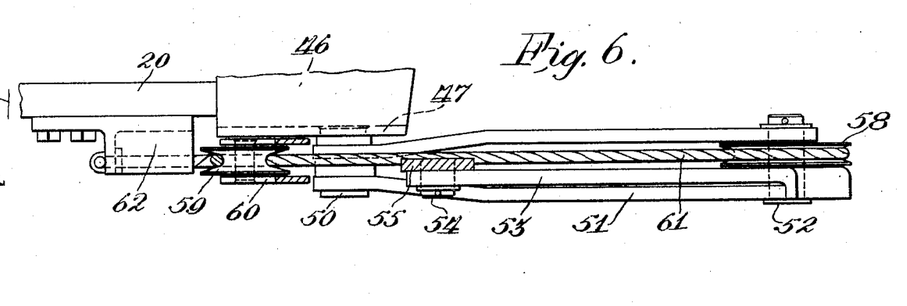
Figure 6 is a top view, partly in section, of the same structure as seen along the line 6—6, looking in the direction of the arrows appearing in Figure 5.

As shown in Figure 1, another electric motor 26 is indicated, which, through reduction gearing, generally indicated at 27, causes a shaft 28 (see also Figure 4) to rotate in a clockwise direction, as seen in said figure. The shaft 28 extends transversely across the main frame 20 just to the rear of the upright channels 23, said shaft carrying and rotating two spaced winding drums 29, only one being shown as this structure is standard in these trucks. It will be understood that one of these drums 29 is arranged adjacent each channel 23. A cable, as indicated in Figure 1 and best shown in Figure 4, is dead-ended on each drum 29 and extends vertically up to the upper end of the channels 23 where each cable 30 (it being understood that there are two) is passed over a sheave 31 (see also Figure 3), said sheaves 31 being carried on a transverse shaft 32 mounted in a bracket 33 suitably made fast to the upper ends of said channels 23. The cables 30 continue on around the sheaves 31, as shown in Figure 4, and are then passed around sheaves 34, there being two such sheaves, each mounted on a shaft 35, the cable then passing upwardly and being dead-ended on the channels 23 as at 35′. The shaft 35 is carried in two members 36 which include a goose neck extension protruding forwardly, as at 37 (see also Figure 2). One of these goose neck elements 36, 37 is on each side adjacent each channel 23, and each goose neck carries an upper guide roller 38 and a lower guide roller 39, which cooperate with a rail flange on the inside of each upright channel 23 to guide the raising and lowering of these members when the cable 30 is actuated, as will later appear. An external guide roller 40 is carried by each goose neck extension 37 on a shaft 41 and, as shown in Figures 3 and 4, these outer guide rollers 40 also roll on a flange of each upright channel 23.

Figure 13:
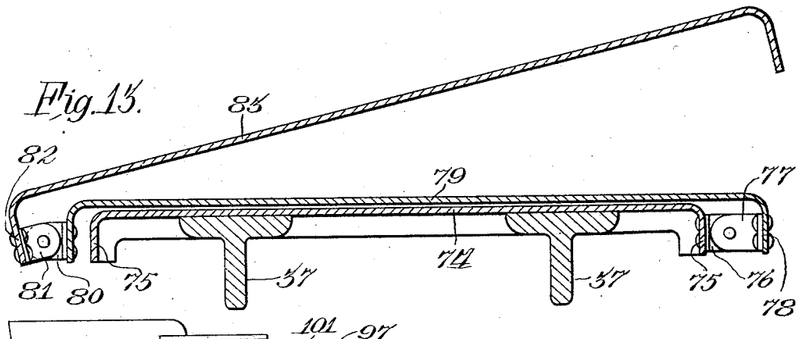
Figure 13 is a cross sectional view through the side tilt platform parts as seen along the line 13—13 appearing in Figure 12, as viewed in the direction of the arrows.

From this much of the description, which has applied mostly to Figures 1, 2, 3 and 4, it will be seen that the front tilt structure is being developed. As far as we have gone, the structure is common to the side tilt type, the first departure from the side tilt structure over the front tilt structure residing, as shown in Figure 13, in the shape of the goose neck extension 37. The description will now continue and will be limited for the present entirely to the front tilt modification shown in Figures 1, 2, 3, 4, 5 and 6.

As best shown in Figures 2 and 4, the goose neck members 37 are spaced apart and each has securely bolted thereto a forwardly extending angle support 42, the angle members in effect forming a channel which extends forwardly, as best appears in Figure 4. Each of the angles 42 at its front end pivotally carries a bracket 43 on a pin 44 for pivotally mounting a platform 45 to be tiltable about the axis of the pin 44. At their back ends the angles 42 and goose necks 37 carry, as best shown in Figure 2, on each side of the machine, an inverted U-shaped support 46, each support at its outer side having a depending extension 47 for a purpose later to appear. As shown in Figure 2, the top sides of the elements 46 and angles 42 all lie flush to form a flat rest in the same horizontal plane, so that the tiltable platform element 45 may lie flatly on these members. At its front end, the platform 45 has a depending skirt 47', which also extends around the sides, as shown at 48 in Figures 1 and 3.

From so much of the description as has been made it will be understood that in the use of these self-propelled tiering shop trucks the tiltable platform 45 normally lies flat in a horizontal position on its supporting elements and that these supporting elements, which comprise the channel support 42, are normally in their lowermost position, as indicated in the dotted line showing in Figure 1. In this position of the platform 45 and lowered position of the member 36, the operator on the platform 25 may run the platform 45 underneath a conventional legged shop skid 49 indicated in Figure 1, which skid is loaded with material to be handled. Then the operator, by means of any suitable control element, causes the motor 26 to operate, which, through the reduction gearing 27, turns the drums 29 to wind the cable 30. This causes the bight or loop of the cables around the sheaves 34 to shorten, with the resultant effect of raising said sheaves 34, and, as these sheaves are mounted in the goose neck elements 36, 37, necessarily the goose neck elements along with the supports 42 and table 45 are elevated along the mast or channel uprights 23. Let us assume that the platform 45 has now been brought to the desired elevated point for convenient discharge of the contents of the skid 49 onto a work bench or the like. With the structure of this invention about to be described, the platform 45 with the skid 49 is caused to tilt in a forward direction about the pivot 44, to discharge the contents of the skid 49 onto the work bench by gravity.

Each depending extension 47, as best shown in Figures 1, 2 and 5, carries a pin 50, each pin carrying a double armed lever 51 that normally extends forwardly and carries at its front ends a pin 52 that has connected to it, at each side of the platform 45, a rearwardly extending lever 53 that is pivoted to a pin 54 carried in a bracket 55 connected to the under side of the tilting platform 45. These levers 51 and 53, as will now be clear, constitute toggle links. Each lever 53 includes an end stop flange 56 that contacts a portion of each of the levers 51 to limit the opening jacknife movement of the toggle links, as shown in Figure 1. Each extension 47 carries at its outer side a sheave 57 and each pin 52 at the breaking point of the toggle carries a sheave 58 arranged between the parts of the double arms 51. Still another sheave 59 is carried in a bracket 60 on each side of the platform 45, as shown in Figure 5. A cable 61 is trained around the sheaves 57, 58 and 59 on each side of the machine, and, as shown in Figures 1 and 2, each cable 61 is dead-ended at its lower end to a fixture 62 on the main frame 20. The other end of the cable 61 passes around sheaves 63 on the outer ends of the shaft 32 heretofore described at the upper end of the mast 23 (see Figures 1 and 3). The end of each cable 61 is then dead-ended to a winding drum 64 arranged on a shaft 65 carried in bearing blocks 66.

The shaft 65 is driven from a worm gear 67 shown in the dotted lines in Figure 3, said worm gear 67 being driven from a worm gear 68 on a vertical shaft 69 (see also Figure 1) that receives its rotation from an electric motor 70, which is carried in a frame 71 suitably made fast, by means of a bracket 72, to the mast channel frames 23. A control element for the electric motor 70 is indicated at 73. It now is clear that by means of the electric motor 70 the cables 61 can be wound up on the drums 64 to shorten said cables, which causes a pulling force on the sheaves 58 at the breaking point of the toggle levers 51, 53. This force then acts to spread the toggles, as shown in Figure 1, and a spreading action of the toggles, of course, creates a push upwardly at the rear end of the tilting platform 45, thus causing said platform to tilt about its pivot pin 44. The limit of tilting movement obviously is controlled by the stops 56. The skid 49, in any suitable fashion, will be held on the platform 45 to prevent its sliding off the same when the platform is tilted. A rear stop or upturned skirt 72 is included in the platform 45 so as to provide a rear stop when passing the platform underneath the skid 49 to pick the same up, and a rear bumper plate 73a is carried by the goose neck member 36, as best shown in Figure 4.

There are times, as when the shop truck is operating in a narrow aisle, that it is difficult and in fact at times impossible to discharge the contents of a skid 49 by a front tilting action. Practice has shown that a lateral or side tilt is, therefore, necessary to meet such conditions. Accordingly, it was a stated object of this invention to provide a side tilting platform for a tiering shop truck which would be a modification of the front structure of this invention. This lateral tilting structure will next be described.

Figure 12:
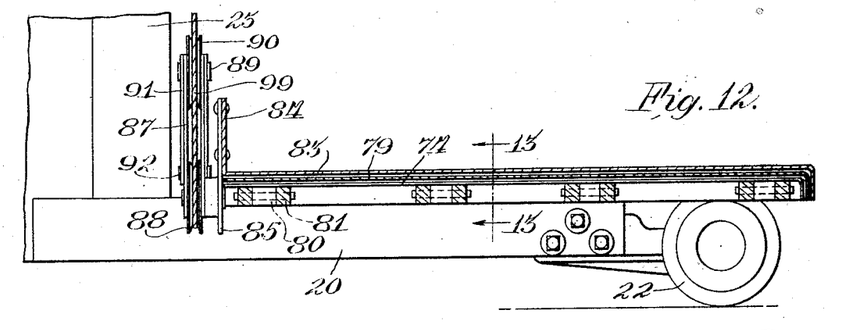
Figure 12 is a side elevational view of the platform structure of the truck for this side tilt arrangement, with the platform parts appearing in section.
Figures 14, 15:
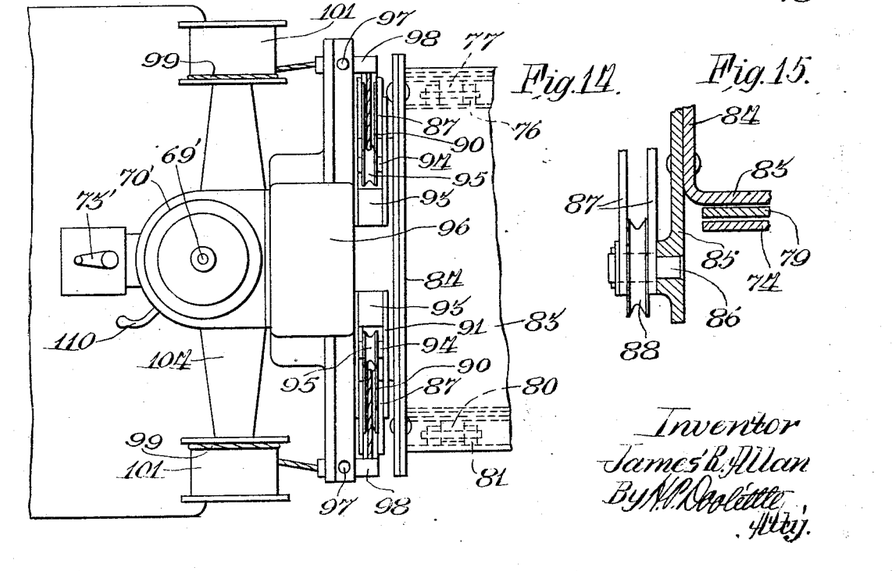
Figure 14 is a fragmentary top plan view of the side tilt truck.
Figure 15 is a sectional view of a detail as seen along the line 15—15 appearing in Figure 7, looking in the direction of the arrows.

Reference should now be made to Figures 7 to 15, inclusive, showing this lateral tilt modification. A special reference to Figure 13 shows that the heretofore described goose neck structure 37 is now slightly modified and assumes the form of a single integral unit which extends forwardly from the channel mast members 23. Mounted on this modified goose neck or supporting structure 37 is a lift platform 74, which is rigidly mounted on these supports 37 and has the downturned skirt formation at its lateral edges, as appears at 75. As shown in Figure 13, the right hand skirt 75 carries a series of spaced brackets 76 to which is pivotally connected a like number of brackets 77 that are mounted on the downturned skirt 78 of a first pivoted or tiltable platform 79 that quite closely fits over the non-tiltable lift platform part 74. The opposite or left hand end of this first tiltable platform 79, as shown in Figure 13, carries a series of spaced brackets 80 to which is pivotally connected a like number of brackets 81 that are carried by the downturned skirt 82 of a second tiltable platform 83 that normally fits down closely over the first tiltable platform 79. The assembly of these tiltable platform elements in their non-tilted positions is clearly shown in Figures 7 and 8, as well as in Figure 12. The second or upper tiltable platform part 83, as clearly shown in Figures 12 and 15, is upwardly bent to form a rear wall part 84. Riveted or otherwise secured to this wall part 84 is a downwardly extending plate 85, which carries at each end a pin 86 which pivotally mounts a two-armed lever 87 and a sheave 88 between the parts of the lever 87, as best shown in Figure 15. It will be understood that this structure of Figure 15 is duplicated at each side of the tilting platform structure. Each double lever 87 carries a pin 89, as best shown in Figures 7, 8 and 12, which pin carries a sheave 90 and also has pivotally connected thereto another lever 91, the two levers in each set on each side of the machine constituting toggle link elements 87, 91. The inner or lower ends of the levers 91, as best shown in Figures 10 and 11, are pivotally connected at 92 to brackets 93 formed on the support element 37 heretofore described.

Each bracket 93 also carries a pin 94, which mounts a guide roller 95. A crosshead 96 is carried at the upper ends of the channel mast members 23, as shown in Figures 7 and 8, and the opposite ends of this crosshead 96 carry eyes 97 for pivotally mounting pulley blocks 98. A cable 99 is dead-ended at 100 on each side of the machine to the main frame 20, as shown in Figure 8, each cable then extending upwardly to be guided around the guide rollers 95; thence around the sheaves 90 carried at the breaking points of the toggle links 87, 91; thence under the sheaves 88; thence over the pulleys in the blocks 98; and, finally said cables 99 are dead-ended on winding drums 101 which correspond with the winding drums 63 heretofore described in connection with the front tilt apparatus.

As appears best in Figures 9 and 14, these winding drums 101 are mounted on a split shaft 102, which corresponds with the shaft 65 in the front tilt modification. Said shaft is carried in bearings 103 in a housing 104. A central bearing 105 is also provided for carrying the hub of a worm gear wheel 106 that is in mesh with the vertical shaft 69', that receives its rotation from the electric motor 70'. A control lever 73' is used by the operator to control the motor 70'. The worm gear wheel 106 is held against axial sliding movement within the bearing 105, as shown in Figure 9, but is carried on a splined intermediate shaft part 107, which splined shaft part includes a collar 108 to make the shaft part 107 movable by a shipper fork 109 controlled by the operator from a lever 110 (see Figure 14). When the shipper fork 109 is shipped, the splined shaft part 107 can be made to drive either shaft part 102 and either winding drum 101 in an obvious manner. The up and down movement of the lift element or support 37 is guided by rollers 38' inside the channel mast frame members 23, as shown in Figure 10.

In operation, the tiering shop truck is moved to position where the collapsed platform parts 79 and 83 appear as shown in Figures 7 and 12, the parts being in their lowermost position with respect to the elevator mast 23, so that the said platform structure may be run under a shop skid 49 to pick up the same. The shop truck is then self-propelled to any desired unloading point where, let us say, it is desired to discharge the material in the skid upon an elevated work bench. Accordingly, the motor 26 is operated to cause the cables 30, heretofore described and shown in Figure 4, to elevate the modified goose neck and support structure 37 along the mast channels 23. We will assume now that the desired elevation suitable for discharge has been reached. The parts are then brought to stop by shutting off the motor 26. Let us assume now that it is desired to discharge an appropriately modified skid 49, which is carried on the top-most platform part 83, laterally to the left as appears in Figure 8. Accordingly, the operator utilizes the lever 110 to ship the splined shaft part 107 to clutch the proper shaft part 102, whereupon, when the motor 70 is started, said shaft part 102 will be rotated to wind the cable 99 about the winding drum 101 at the right hand side, as appears in said Figure 8. This shortening up effect of the cable 99 causes the cable to pull the sheave 90 in a manner to spread or open the toggle link structure 87, 91, and also to lift up on the sheave 88 to raise an end of the top-most platform part 83 and to tilt the same about its pivotal connections 81, 80 in the manner shown also in Figure 13. When the desired amount of tilt has been effected, the contents of the skid are discharged by gravity.

Conversely, if it is desired to tilt the skid and platform structure laterally to the opposite direction, the splined shaft part 107 is shipped to the left, as appears in Figure 9, to cause the left hand winding drum 101 to shorten the left hand cable 99, and the same operation then ensues, with the exception that the platform part 79 is caused to tilt about the pivot structure 76, 77. In this case, the part 83 nests over said part 79 and tilts as a unit with it, as will be clear.

The motors 70 and 70', it will be understood, are of the reversible type, so that, after the contents of a tilted skid have been discharged, the platform element or elements with the skid may be returned to their normally untilted or horizontal positions, as will be understood.

From this detailed description, it is now clear that an improved tilting structure for unloading material from skids carried by the lift element of a tiering shop truck has been provided, which achieves all of the desirable objects of this invention heretofore recited. The tilting structure is advantageously employed in various shop material handling situations, such for example as in charging cupolas; in charging tumbling barrels for tumbling castings, bolts, nuts, forgings and the like; for handling coils of wire or other parts to be formed into piles; for charging or loading serving tables at drill presses; for loading magazine hoppers of all kinds of automatic shop machines; for tiering skids for storage purposes; and also for loading storage bins with castings, forgings, etc. Other uses will, of course, suggest themselves to those skilled in this art. Where aisle space on a shop floor permits the requisite room for maneuvering with the truck, the front tilt should suffice for all kinds of handling jobs of the kind just recited, and, where aisle space does not permit the necessary room for proper maneuvering, the side tilt modification of this invention is very advantageous because it allows lateral discharge of the skid without necessitating further maneuvering of the truck.

It is the intention to cover all such changes and modifications of the invention herein illustrated that do not materially depart from the spirit and scope of the invention as is indicated by the scope of the following claims.

What is claimed is:

1. The combination with a shop truck having a main frame and a vertical upright, a lift element movable along the upright, of a tiltable platform adapted to carry a material handling skid, said tiltable platform having pivotal connection with said lift element, a toggle link connected between the lift element and platform for operating the tilting of said platform, a pulley carried by the toggle link at its breaking point, a cable trained around said pulley, and means for actuating the cable.

2. The combination with a shop truck having a frame carrying a mast structure and a platform lift element movable along the mast structure, of a platform tiltably mounted on said lift element, toggle link mechanism on opposite sides of the lift element and connected there-between and the tiltable platform, a pair of cables dead-ended to the frame and trained around sheaves carried by the lift element and the mast structure, said cables also trained around pulleys carried by the toggle links at their breaking points, a pair of windlasses on the mast structure to which the other end of one each of the cables is dead-ended, and a motor for operating said windlasses.

3. The combination with a shop truck having a frame carrying a mast structure and a platform lift element movable along the mast structure, of a platform pivotally connected to said lift element, link mechanism on opposite sides of the lift element and connected therebetween and the tiltable platform, a cable dead-ended to the frame and trained around sheaves carried by the lift element the link mechanism and the mast structure, a windlass on the mast structure to which the other end of the cable is dead-ended, and a motor for operating said windlass to move the link mechanism to cause tilting of the pivoted platform.

4. The combination with a shop truck having a frame carrying a mast structure and a platform lift element movable along the mast structure, of a platform tiltably mounted on said lift element, toggle link mechanism on each side of the lift element and connected therebetween and the tiltable platform, a flexible element dead-ended to each side of the frame and trained around sheaves carried by the lift element the toggle mechanisms and the mast structure, winding mechanism on the mast structure to which the other ends of the flexible elements are dead-ended, and means for operating said winding mechanism.

5. The combination with a shop truck comprising a vehicle having a frame and spaced upright channel mast members, goose neck support members rollingly supported in the upright channel mast members, a motor driven winding drum and cable structure for supporting and operating the goose neck support members and a platform carried by said goose neck support members; of a platform tiltably carried on the first mentioned platform, toggle link mechanism between the platforms, and a motor operated winding drum and cable structure operating directly on the toggle mechanism for opening the said toggle mechanism to tilt the second mentioned platform.

6. The combination with a shop truck comprising a vehicle having a frame and spaced upright channel mast members, goose neck support members rollingly supported in the upright channel mast members, a motor driven winding drum and cable structure for supporting and operating the goose neck support members and a platform carried by said goose neck support members; of a platform pivotally connected to the first mentioned platform to be tiltable relative thereto, toggle link mechanism connecting the second platform to the first platform, a winding drum and cable structure for opening the toggle mechanism to tilt the second mentioned platform, and a second motor for operating said winding drum.

7. The combination with a shop truck comprising a vehicle having a frame and an upright mast, a support member rollingly supported on the mast, a motor driven winding drum and cable structure for supporting and operating the support member and a lift platform carried by said support member; of a platform tiltably carried on the lift platform, link structure between the platforms, and a second motor mounted on the mast to operate means for moving the link mechanism to tilt the second mentioned platform.

8. The combination with a shop truck comprising a vehicle having a frame and spaced upright channel mast members, goose neck support members rollingly supported in the upright channel mast members, a motor driven winding drum and cable structure for supporting and operating the goose neck support members and a platform carried by said goose neck support members; of a platform tiltably carried on the first mentioned platform, toggle link mechanism between the platforms, a winding drum and cable structure for opening the toggle mechanism to tilt the second mentioned platform, and a motor mounted on the mast members for operating said winding drum.

9. In a shop truck, a main frame, a mast, a lift element movable along the mast, a laterally tiltable platform mounted on said lift element by a double set of hinges for tilting movement to either side of the lift element, and toggle link mechanism connected between the lift element and tiltable platform for causing such tilting movement.

10. The combination with a shop truck having a frame, an upright mast and a lift element movable along the mast; of a platform structure tiltably mounted on the lift element, toggle links between said parts for tilting said tiltable platform structure to either side laterally with respect to the lift element, pulleys of which one is located at the breaking point of each toggle link, and cables trained over the pulleys for spreading the toggle links.

11. The combination with a shop truck having a frame, an upright mast and a lift element movable along the mast; of a platform structure tiltably mounted on the lift element, toggle links on each side of the lift element for tilting said tiltable platform structure, and power operated means including pulleys one of which is carried by each toggle link for selectively actuating either means to cause the platform structure to tilt laterally to either side relative to the lift element.

12. The combination with a shop truck having a frame, an upright mast and a lift element movable along the mast, of a platform structure tiltably mounted on the lift element, a pair of toggle links for tilting said tiltable platform structure to either side laterally with respect to the lift element, and means for actuating one of said toggle links while holding the other idle.

13. In a shop truck, a frame carrying an upright, a lift element movably carried by the upright, a motor operated cable and pulley system for moving the lift element, a platform tiltably carried by the lift element, a toggle link connected between the element and platform, a pulley carried by the toggle link at its breaking point, a cable dead-ended to the frame and trained over pulleys on the lift element upright and toggle link pulley, and means for winding said cable to shorten the same thereby moving the toggle pulley to spread the toggle to effect tilting of the platform.

14. In load lifting mechanism, the combination of a tiltable load carrier and pivotally connected links for tilting the same, a cable passing downwardly and then laterally toward the pivot of the links and there arranged to act to spread the links, there being a guide secured to the carrier and engaging the cable at the end of the said downwardly extending portion, whereby an upward pull on the cable acts to directly lift the carrier, and an abutment on one of the links arranged to engage the link to which the abutment carrying the link is pivoted, to limit the tilting movement of the carrier.

15. A load handling device, comprising an elevatable support, and means to guide the same for raising and lowering movement, a platform pivotally mounted thereon, a pair of toggle links between the support and platform, a downwardly extending cable, an anchor for the lower end of the cable on said means, there being means to draw on the upper end of the cable, a guide member on the platform overlying a portion of the cable in such manner that the initial pull on the cable acts on the guide to raise the platform, a portion of the cable adjacent the guide being looped and connected to the toggle links for operation thereon to further raise the platform.

16. In a load handling mechanism, load lifting means including a substantially upright guide, a carriage, and a tiltable load carrier supported by the carriage, an expansible device arranged between the carrier and carriage and operable by a horizontal movement imparted thereto to raise the carrier, a cable, and means guiding the same downwardly, thence in a loop to engage the expansible device, and again downwardly, one end of the cable being anchored, to the guide, and there being means to exert a pull on the other end of the cable.

17. In a load handling mechanism, load lifting means including a guide, a carriage, and a tiltable load carrier pivoted to the carriage, an expansible device arranged between the carrier and carriage and including toggle links and a sheave at the connection of the links, there being a sheave on the carrier longitudinally spaced from the first named sheave, and a cable extending downwardly, thence beneath the second mentioned sheave and thence over the first mentioned sheave, one end of the cable being anchored, and there being power means arranged to exert a pull on the other end of the cable.

18. A load lifting and handling device, comprising a carriage, a trackway on which the carriage is arranged to move, means for raising and lowering the carriage on the trackway, a tiltable platform pivotally supported by the carriage, and power means including a cable anchored at one end to the trackway and arranged to act on the platform to tilt it in any raised or lowered position on the trackway.

19. In a load lifting device, a carriage arranged to be raised and lowered, a guide for the carriage, a platform pivoted to the carriage, a pair of toggle links interposed between the platform and carriage, an idler at the intermediate pivot of the toggle, a cable anchored at one end to the guide and arranged to draw on the idler to lengthen the toggle and thereby tilt the platform, said cable extending above the platform and arranged to directly draw on the same upwardly to initiate the tilting thereof.

20. In an industrial truck, an upright trackway, a carriage mounted on the trackway having an outwardly extending arm, a platform carried on the arm, a pair of toggle links interposed between the platform and carriage and a downwardly extending cable anchored at one end to the truck and having a loop for running connection with the toggle links, there being means for drawing on the cable and tending to straighten it, thereby actuating the toggle to lift the platform.

21. In a device of the character described, an upright trackway, a carriage mounted thereon, a platform pivoted to the carriage, a cable hoist in fixed position relative to the trackway, and comprising a motor and cable drum driven thereby, a cable arranged to be drawn on by the drum and having a portion extending substantially from the top of the trackway to the bottom thereof and anchored thereto at the lower end of the cable, toggle linkage between the platform and carriage, there being guides forming a loop in the cable, the closed end of the loop engaging the toggle to actuate it whenever the cable is drawn on by the drum, and means for separately controlling the raising and lowering of the carriage and the operation of said cable hoist.

22. In an industrial truck, a trackway, a carriage mounted to traverse the trackway, a platform pivoted to the carriage, a pair of mutually pivoted toggle links interposed between the platform and carriage, a sheave in fixed position on the carriage, a sheave carried by the links at their pivot connection, and a sheave in fixed position on the platform, there being a cable passing downwardly along the trackway and engaging all three sheaves, said cable having one end anchored to the truck and there being power means connected to the other end to draw on the cable, for the purpose specified.

23. In an industrial truck in combination, a tier lift mechanism comprising a trackway, a carrier on the trackway, and a load support tiltably mounted on the carrier, there being tilting mechanism for the support, comprising a flexible member, spaced and fixed guiding elements therefor above and below the carrier, means to normally hold the member under substantially uniform tension but operable to increase such tension, means on the carrier for guiding a portion of the flexible member out of a straight line between the spaced guiding elements, the guiding means on the carrier being so arranged that the increased tension on the member will act on the support through the guiding means thereon to tilt the support.

24. In an industrial truck, a tier lift mechanism including a trackway, a carrier, and a tiltable platform on the carrier, a cable anchored to the trackway at one end and guided for pulling movement tending to straighten the cable along a line substantially parallel to the trackway, there being means associated with the carrier and platform and arranged to guide a stretch of the cable out of such straight line, said means being further arranged in such manner that a pull on the cable will react on the platform to tilt the same.

25. A load raising and dumping mechanism comprising, a frame including a trackway, a carrier movably guided on the trackway, a load support tiltably mounted on the carrier, a flexible member extending along the trackway and anchored at one end to the frame, a fixed guide on the frame for the member materially spaced from the anchored end, means for pulling on the flexible member, and means movable with the carrier and support arranged to guide and to be acted on by the flexible member when pulled by the pulling means to tilt the support on the carrier, irrespective of the position of the carrier on the trackway.

26. Load handling mechanism, comprising an upright guideway, a load carrier movable on the guideway, said carrier comprising a main frame and a tilting load platform pivotally secured to the frame, a cable extending along the guideway and anchored thereto at one end, means for drawing on the other end of the cable, there being means on the carrier and platform for normally guiding the cable into a loop, said latter means being relatively movable in such manner that shortening of the loop, by such drawing on the cable, will tilt the platform about its pivotal connection to dump a load from the platform.

27. In mechanism of the kind described, the combination of a trackway, a tiltable load handling means and a raisable support therefor movable on the trackway, to which support said means is pivoted, a lifting device connecting said means and support, a flexible tension member, and means to hold spaced portions thereof substantially parallel to the trackway, and an intermediate portion in a loop engaging the lifting device, said device being operable by shortening the loop to raise the load handling means.

In testimony whereof I affix my signature.
JAMES R. ALLAN.